J. F. BLESS.
GAS SAD IRON.
APPLICATION FILED JULY 24, 1912.
1,058,347.
Patented Apr. 8, 1913.
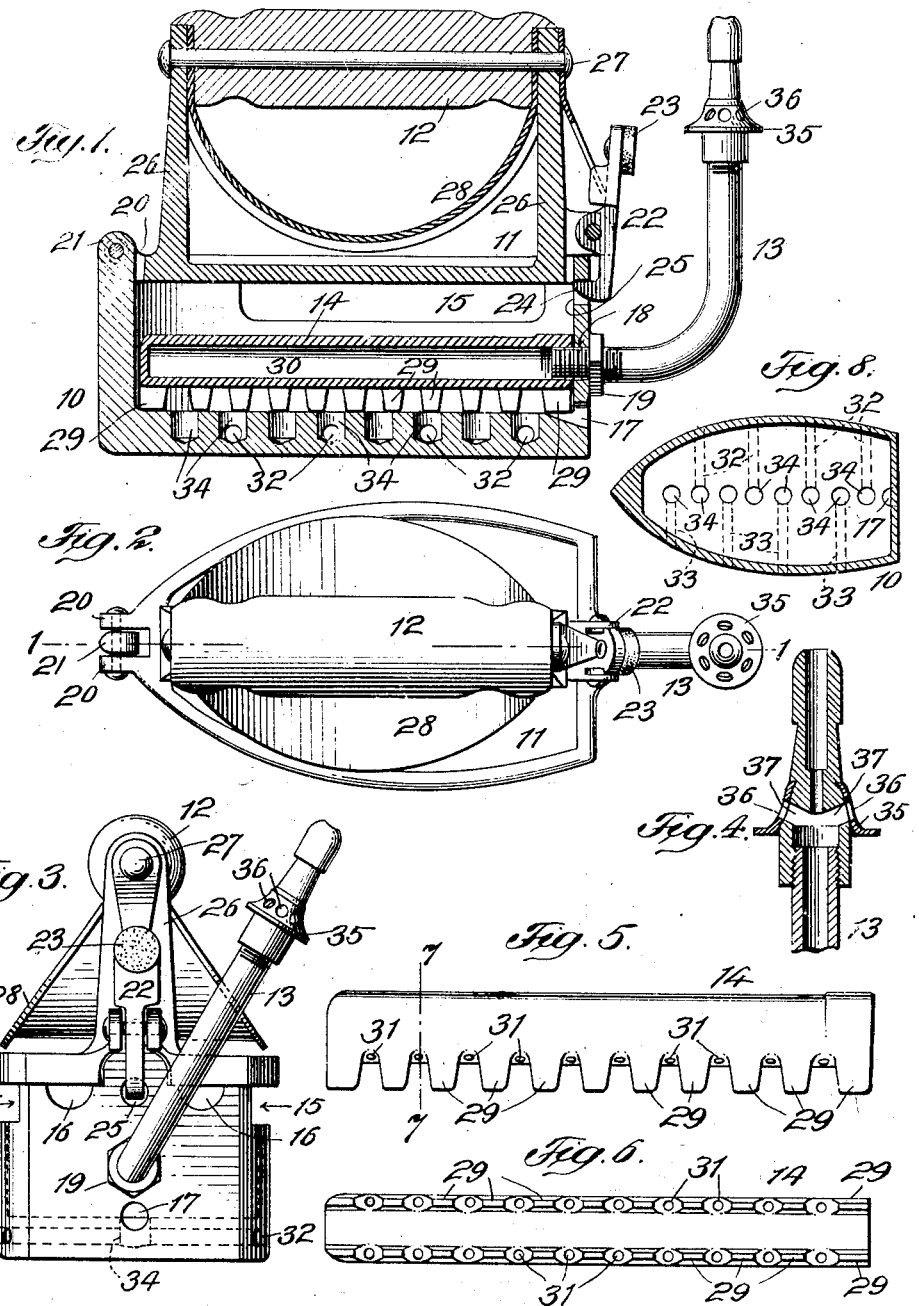
WITNESSES
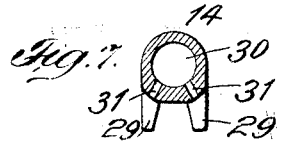
INVENTOR
James F. Bless
BY
Chas. E. Gill
ATTORNEY

UNITED STATES PATENT OFFICE.

JAMES F. BLESS, OF NEWARK, NEW JERSEY.

GAS SAD-IRON.

1,058,347.

Specification of Letters Patent. Patented Apr. 8, 1913.

Application filed July 24, 1912. Serial No. 711,195.

*To all whom it may concern:*

Be it known that I, JAMES F. BLESS, a citizen of the United States, and a resident of Newark, in the county of Essex and State of New Jersey, have invented certain new and useful Improvements in Gas Sad-Irons, of which the following is a specification.

The invention relates to improvements in gas sad-irons, and it consists in the novel features, structure and combinations of parts hereinafter described, and particularly pointed out in the claims.

It is well known that considerable difficulty has been experienced in providing a thoroughly efficient and continuously satisfactory sad-iron heated with the use of gas, and the object of the present invention is to provide a gas sad-iron of novel construction and capable of successful use.
Among the more important objects of my invention are to provide for adequate combustion within the body of the iron, the correct heating of the lower part of the iron so that the ironing surface may be maintained at a proper temperature, the provision of a special burner within the iron and a novel arrangement of air channels for supplying a steady and adequate volume of air for maintaining proper combustion at said burner, and the providing of a suitable and adequate top for the iron capable of being readily opened and closed, the whole being a compact easily constructed and operated gas sad-iron capable of ready manufacture and convenient of use.

The iron of my invention comprises a hollow body portion, a hinged top plate or cover thereon and carrying the handle, a novel burner within the hollow body of the iron and adjacent to the bottom of the interior chamber therein and extending lengthwise and centrally of said chamber, means for supplying a regulated quantity of gas to said burner, and air conduits extending from the sides of the iron through the base thereof to discharge openings adjacent to said burner, said air conduits being arranged in staggered order and only extending horizontally halfway through the base of the iron, and being independent of each other; all of which will be readily understood from the detailed description hereinafter presented, reference being had to the accompanying drawings, in which:
Figure 1 is a central vertical longitudinal section through a gas sad-iron constructed in accordance with and embodying my invention, the section being on the dotted line 1—1 of Fig. 2; Fig. 2 is a top view of the same; Fig. 3 is a rear end view of the same; Fig. 4 is an enlarged central vertical section through the nipple and regulating valve connected with the metal pipe leading to the burner in the iron and adapted at its upper end to receive the usual flexible hose connection leading from the gas supply pipe or bracket of a house; Fig. 5 is a side elevation, on a larger scale than that of Fig. 1, of the burner detached from the iron; Fig. 6 is a bottom view of the same; Fig. 7 is a vertical transverse section of the same on the dotted line 7—7 of Fig. 5, and Fig. 8 is a horizontal section, on a reduced scale, through the body of the iron and is presented to illustrate the arrangement of the air conduits or passages leading through the opposite sides of the base of the iron to vertical discharge openings in said base, said openings being below the elongated gas burner.

In the drawings, 10 designates the body of the iron, 11 the cover thereon, 12 the handle connected with said cover, 13 the gas supply pipe connected with the body 10, and 14 an elongated burner applied within the hollow interior of the body 10 and resting against the flat bottom thereof. The body 10 is of conventional outline, being pointed at one end and having sides diverging therefrom to the rear end of said body which is reasonably broad, as shown. The body 10 has a hollow interior and is cast with an entirely open upper end, and the sides of the body 10 are formed in their upper portions with elongated side openings 15, while the rear end of said body is formed with openings 16 and a small lower opening 17. The rear end of the body 10 is also formed with an opening 18 to receive the lower end of the gas supply pipe 13 which is threaded to engage a threaded hole in the rear end of the burner 14 and clamped in desired position by means of a nut 19.

The cover 11 fits entirely over the upper end of the body 10, and at its forward end is formed with ears 20, which straddle a lug 21 extending upwardly from the body, and said cover is hinged to said body by means of a pin extending transversely through said ears and lug. The rear end of the cover 11 is provided with a spring latch 22 having a thumb-piece 23 and a dog 24, the latter being adapted to enter an opening 25 in the rear end of the body 10 and detachably lock the rear end of the cover 11 upon said body. When it is desired to open the cover 11 from the interior chamber of the body 10, the operator will press on the thumb-piece 23 and turn the cover 11 upwardly on its front hinge. The cover 11 is cast integrally with standards 26 between which the handle 12 is secured on a rod 27, a shield 28 also being provided below the handle 12, as usual.

The burner 14 is a hollow elongated casting extending from the front to the rear of the body of the iron and provided at opposite side edges with a series of legs or feet 29 which rest upon the flat interior bottom of the iron and support the burner 14 suitably above the same. The burner 14 contains an interior elongated tubular chamber 30 and is formed with burner orifices 31 at opposite sides of its lower portion, these orifices 31 leading downwardly and outwardly from the chamber 30 to the spaces between the legs 29, as clearly represented in Figs. 5, 6 and 7. The forward end of the burner 14 is closed, as shown in Fig. 1, and its rear end is open and internally threaded to receive the threaded end of the pipe 13, said pipe at its lower end being freely passed through the opening 18 in the body of the iron and screwed into the threaded opening in the rear end of the burner 14. After the pipe 13 has been screwed into the burner 14 to a sufficient extent, the nut 19 may be tightened against the rear end of the body of the iron to serve as a clamp for binding said pipe in rigid position and at such inclination with respect to its upper portion as may be desirable. The opening 17 in the rear end of the body of the iron leads into the space between the two rear legs 29 of the burner 14 and serves to admit air to the upper flat surface of the bottom of the iron.

The bottom of the body of the iron is formed with two series of horizontal inlet conduits 32, 33 for air, the conduits 32 being in staggered relation to the conduits 33, as shown in Fig. 8, and said conduits 32, 33 at their inner ends, which terminate at about the longitudinal center of the bottom of the iron, leading into vertical discharge openings 34, which are of somewhat greater diameter than the conduits and extend upwardly through the inner bottom surface of the iron centrally below the burner 14.

The air for supporting combustion is supplied through the opening 17, conduits 32, 33 and vertical discharge openings 34. The openings 15, 16 are outlet openings and under varying conditions air may enter them also. The conduits 32, 33 are drilled inwardly through the sides of the bottom of the iron and extend only half way through said bottom, as shown in Fig. 8, and this arrangement I have found to be a distinct advantage in that each conduit is wholly independent of the others and not subject to counter currents as would be the case if the conduits were in communication with one another or if conduits at both sides of the iron led into the same discharge openings 34. In the present instance one discharge opening 34 is provided for each conduit and each discharge opening is independent of the other discharge openings. I also find it a distinct advantage to use a cast iron burner 14 and to support it directly upon the flat bottom of the iron. The manner of securing the burner in the body of the iron is also advantageous in that the burner is held stationary simply by screwing the lower end of the gas pipe 13 thereinto and locking said pipe by means of the nut 19. The parts of the iron may be readily assembled, and in use the iron has proven to be of very satisfactory character. One of the more essential features of the invention resides in the burner 14 and in its relation to the flat upper surface of the bottom of the iron, the gas outlet orifices 31 being reasonably close to said bottom and enabling the maintenance of a proper and uniform heat in the bottom of the iron when the latter is in use. The conduits 32, 33 and discharge openings 34 are also of very great advantage in assuring the proper combustion within the body 10. I am enabled with the use of my invention to maintain the lower portion of the iron at a proper degree of heat for effective use, while the upper portion of the iron will stand at a moderate heat. One of the difficulties in the construction and use of gas heated sad irons has been the tendency of the flames to at times extend out through the sides of the iron, with the resultant danger of igniting the clothes of the user of the iron, and this objection is wholly obviated by my invention, the sides of my iron being closed at their lower portions above the conduits 32, 33 and the flames from the burner 14 being confined down against the upper flat surface of the bottom of the iron.

The gas pipe 13 may be turned to any inclination best suited to the wishes of the operator, and usually will be inclined toward the right, as illustrated in Fig. 3 and in said position rigidly held by means of the nut 19, but one advantage of my invention is that the pipe 13 may be turned to a reverse position or toward the left from the position shown in Fig. 3 so as to accommodate the iron for the use of a person desiring to operate the same with the left hand. I also provide the pipe 13 with a regulator valve 35 which is in the form of a sleeve encircling the nipple of the pipe and having a series of openings 36 to be placed more or less in register with a series of corresponding openings 37 leading to the interior of the lower portion of the nipple and the upper end of the pipe 13, the openings 36 being exposed to the atmosphere and the openings 37 being more or less closed as the valve is turned. The nature of the flame within the body of the iron may be regulated by the adjustment of the valve 35.

The iron as a whole has been designed with the view of securing maximum efficiency, of enabling the maintenance of a proper and uniform heat at the bottom of the iron, of obviating any danger of the flames within the iron reaching the clothing of the operator or the goods being ironed, of preventing undue heating of the upper portion of the iron, and of providing a construction of durable character and capable of being readily manufactured and sold at reasonable expense.

What I claim as my invention and desire to secure by Letters Patent, is:

1. A gas sad-iron comprising a hollow body-portion, a cover therefor, a hollow elongated gas-burner longitudinally disposed within said body-portion over the bottom thereof and having outlet orifices at its lower opposite edges, conduits in the bottom of the iron for admitting air laterally through the same to the central portion thereof below said burner, and means for supplying gas to the burner comprising a pipe inserted freely through a hole in the rear end of the iron and screwed into the rear end of the burner and a nut on said pipe to bind against the rear end of the iron.

2. A gas sad-iron comprising a hollow body-portion, a cover therefor, a hollow elongated gas-burner longitudinally disposed within said body-portion over the bottom thereof and having at its lower opposite edges a series of downwardly extending legs and outlet orifices at the spaces between said legs, air conduits leading laterally through the bottom of the iron to the central portion thereof, vertical discharge openings at said central portion in communication with said conduits and below said burner, and means for supplying the burner with gas.

3. A gas sad-iron comprising a hollow body-portion, a cover therefor, a hollow elongated gas-burner longitudinally disposed within said body-portion over the bottom thereof and having at its lower opposite edges a series of downwardly extending legs and outlet orifices at the spaces between said legs, means for admitting air to the lower side of said burner, and means for supplying gas to the burner comprising a pipe inserted freely through a hole in the rear end of the iron and screwed into the rear end of the burner and a nut on said pipe to bind against the rear end of the iron.

4. A gas sad-iron comprising a hollow body-portion, a cover therefor, a hollow elongated gas-burner secured longitudinally within said body-portion over the bottom thereof and having outlet orifices at its lower opposite edges, means for supplying the burner with gas, and means for admitting air to the lower side of said burner comprising conduits leading laterally from opposite sides of the iron through the bottom thereof to the central portion of said bottom and discharge openings at said central portion in communication with said conduits and below said burner, each conduit and its discharge opening being independent of the others.

5. A gas sad-iron comprising a hollow body-portion, a cover therefor, a hollow elongated gas-burner secured longitudinally within said body-portion over the bottom thereof and having outlet orifices at its lower opposite edges, means for supplying the burner with gas, and means for admitting air to the lower side of said burner comprising conduits leading laterally from opposite sides of the iron through the bottom thereof to the central portion of said bottom and vertical discharge openings at said central portion in communication with said conduits and below said burner, the conduits being arranged in staggered order and each conduit leading to an independent discharge opening.

6. A gas sad-iron comprising a hollow body-portion, a cover therefor, a hollow elongated gas-burner longitudinally disposed within said body-portion over the bottom thereof and having at its lower opposite edges a series of downwardly extending legs and outlet orifices at the spaces between said legs, means for supplying the burner with gas, and means for admitting air to the lower side of said burner comprising conduits leading laterally from opposite sides of the iron through the bottom thereof to the central portion of said bottom and vertical discharge openings at said central portion in communication with said conduits and below said burner, the conduits being arranged in staggered order and each conduit leading to an independent discharge opening.

Signed at New York city, in the county of New York and State of New York, this 23rd day of July A. D. 1912.

JAMES F. BLESS.

Witnesses:
ARTHUR MARION,
CHAS. C. GILL.